US012596718B2

(12) United States Patent
Yan et al.

(10) Patent No.: US 12,596,718 B2
(45) Date of Patent: Apr. 7, 2026

(54) PREDICTIVE MULTIDIMENSIONAL SEARCH AND SELECTION TOOL

(71) Applicant: Iron Mountain Incorporated, Boston, MA (US)

(72) Inventors: Lucy T. Yan, Boston, MA (US); Nicole C. Reineke, Northborough, MA (US)

(73) Assignee: Iron Mountain Incorporated, Portsmouth, NH (US)

( * ) Notice: Subject to any disclaimer, the term of this patent is extended or adjusted under 35 U.S.C. 154(b) by 0 days.

(21) Appl. No.: 18/138,372

(22) Filed: Apr. 24, 2023

(65) Prior Publication Data

US 2024/0354306 A1     Oct. 24, 2024

(51) Int. Cl.
| *G06F 16/2455* | (2019.01) |
| *G06F 16/2453* | (2019.01) |
| *G06F 16/2457* | (2019.01) |

(52) U.S. Cl.
CPC .. *G06F 16/24564* (2019.01); *G06F 16/24542* (2019.01); *G06F 16/24578* (2019.01)

(58) Field of Classification Search
None
See application file for complete search history.

(56) References Cited

U.S. PATENT DOCUMENTS

| 8,738,422 | B2 | 5/2014 | Lerner et al. |
| 8,892,455 | B2 | 11/2014 | Lerner et al. |
| 9,195,953 | B2 | 11/2015 | Borgerson et al. |
| 9,677,892 | B2 | 6/2017 | Lerner et al. |
| 9,964,410 | B2 | 5/2018 | Borgerson et al. |
| 10,317,219 | B1 | 6/2019 | Borgerson et al. |
| 10,962,373 | B2 | 3/2021 | Lerner et al. |
| 11,782,588 | B1 * | 10/2023 | Bachmann .......... G06F 3/04842 |
| | | | 702/5 |
| 2009/0048938 | A1 * | 2/2009 | Dupray .............. G06Q 30/0641 |
| | | | 705/27.1 |
| 2015/0026088 | A1 | 1/2015 | Alber et al. |
| 2022/0207575 | A1 * | 6/2022 | Wilson .................. G06Q 20/203 |
| 2022/0207846 | A1 * | 6/2022 | Angevine .............. G06T 17/05 |

OTHER PUBLICATIONS

Varshini, Predicting an ideal city to migrate, by exploring its neighborhoods in Canada, 2020 (Year: 2020).*

* cited by examiner

*Primary Examiner* — Dawaune A Conyers
(74) *Attorney, Agent, or Firm* — Nutter McClennen & Fish LLP

(57)     ABSTRACT

A Predictive Multidimensional Search and Selection Tool (PMST) allows users to leverage publicly available historic and predictive data in decision-making processes such as searches and queries, particularly (but not limited to) decision-making processes relating to location- and time-based decisions such as, for example, where and when to locate, relocate, or take other action for habitation, business, or other concerns. Embodiments combine predictive modeling with the ability to set rules and define human-in-the-loop (HITL) edge cases for long-term decision-making based on user-specified priorities and data sources (including external data sources such as publicly available historic and predictive data) to use as filters in predicting locations and time-frames such as for determining habitation or storage options that meet the individual user's need.

21 Claims, 4 Drawing Sheets

SEARCH OR QUERY

XXXXXX XXXXX

FILTERS

Solar Power Availability
        [Hours usable sunlight per year]

Flood Risk
        [Immediate (within 5 years), Near Term (within 10 years), Long Term (after 10 years)]

Dark Fiber Availability
        [Number of potential providers]

U.S. EPA Drinking Water Availability
        [Population Capacity]

USGS National Seismic Hazard Map
        [Risk Tolerance]

Desired Timeframe
        [Year, Duration]

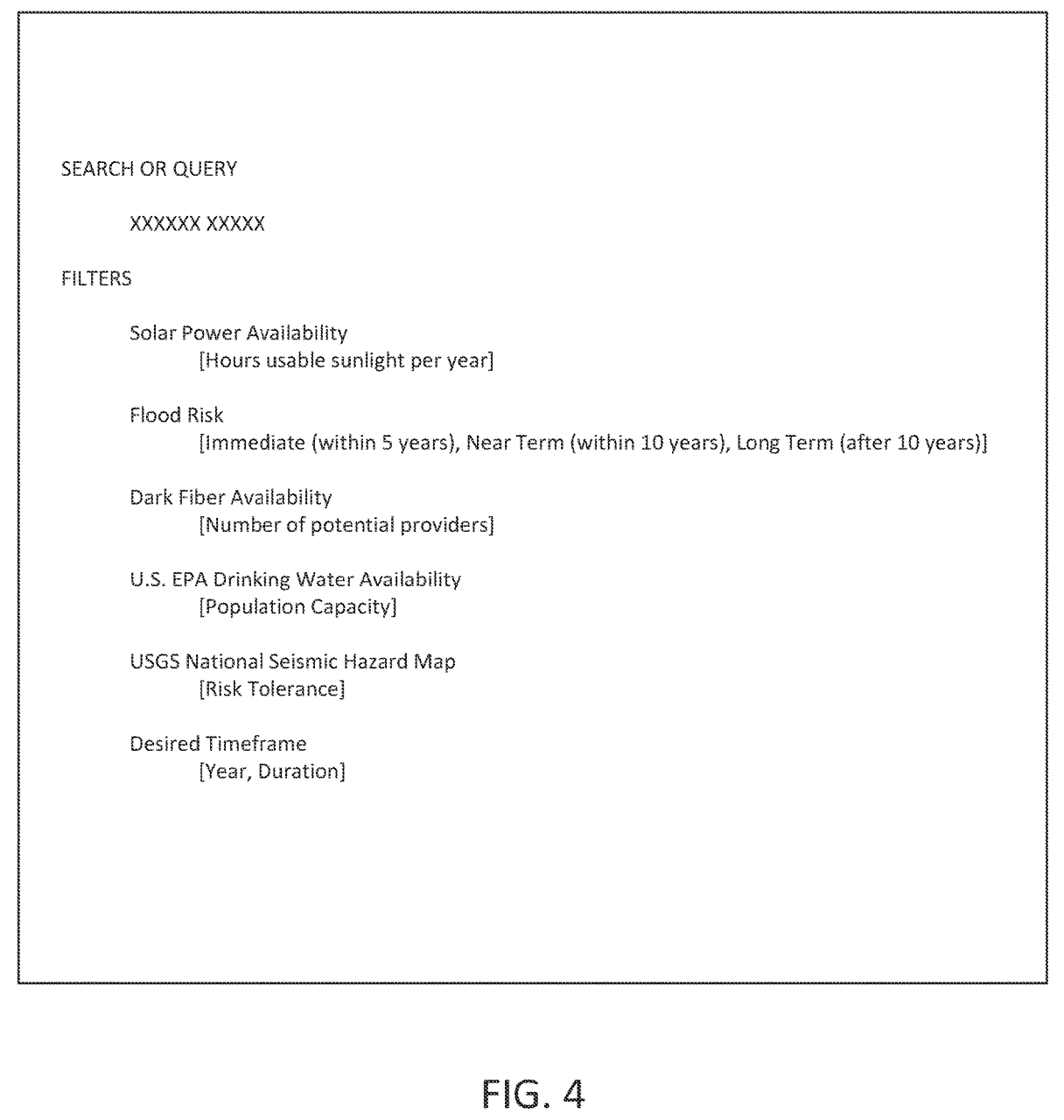

SEARCH OR QUERY

XXXXXX XXXXX

FILTERS

Solar Power Availability
            [Hours usable sunlight per year]

Flood Risk
            [Immediate (within 5 years), Near Term (within 10 years), Long Term (after 10 years)]

Dark Fiber Availability
            [Number of potential providers]

U.S. EPA Drinking Water Availability
            [Population Capacity]

USGS National Seismic Hazard Map
            [Risk Tolerance]

Desired Timeframe
            [Year, Duration]

FIG. 4

PREDICTIVE MULTIDIMENSIONAL SEARCH AND SELECTION TOOL

CROSS-REFERENCE TO RELATED APPLICATION(S)

None.

FIELD OF THE INVENTION

The invention generally relates to a predictive multidimensional search and selection tool that allows users to leverage publicly available historic and predictive data in decision-making processes.

BACKGROUND OF THE INVENTION

In today's information age, vast amounts of data are available at a person's whim such as from the Internet or other ready sources. This includes not just "raw" data such as facts and figures (some of which may be mandated by law to be published, e.g., population statistics, flood risks, solar index, etc.) but also a wide variety of pre-processed and pre-analyzed data such as predictive data on topics such as climate change, human evolution and migration, technology trends, housing trends, natural resource trends, education and job trends, etc. While data is available and usable in theory, it is hard for people to use this data in a practical sense for making day-to-day decisions, even by data scientists and other data experts, due to such things as the data being hosted on separate platforms and being accessed through different interfaces, the different formats of the data, the enormous quantity of data, inconsistencies and errors in the data, and complexities of the data itself including data formats and data obsolescence over time. Thus, while the amount and types of available data seem to increase exponentially, the data is underutilized from a practical perspective.

SUMMARY OF VARIOUS EMBODIMENTS

In accordance with one embodiment of the invention, a predictive multidimensional search and selection tool includes a predictive multidimensional search and selection tool (PMST) manager comprising a primary source engine that generates and stores primary source data in the at least one datastore; a secondary source engine that obtains secondary source data via the at least one communication interface and stores the secondary source data in the at least one datastore, the secondary source data including publicly available predictive data from a plurality of secondary data sources; a location service that collates the primary source data and the secondary source data by location and time to produce aggregate data; and a rules engine that applies the aggregate data to user searches in accordance with user-specific rules stored in the at least one datastore to produce a number of output options, the user-specific rules including a user-specific ethos that specifies user-selected secondary data sources of the plurality of secondary data sources and relative weights of the user-selected secondary data sources to apply to the user search.

In various alternative embodiments, the primary source data may comprise at least one of company-specific data and analytics derived from the company-specific data, and the secondary source data may comprise at least one of online source data and analytics derived from the online source data. The primary source engine, the secondary source engine, and/or the location service may verify and/or embellish the data. The user-specific rules may include criteria for triggering human-in-the-loop intervention. The PMST manager may also comprise a historian that stores historical data relating to prior searches, selections, and related decision-making processes.

Embodiments described and claimed herein have the effect of transforming computer search and query tools to utilize publicly available predictive data from a wide variety of secondary data sources. For at least these reasons, the activities described and claimed herein provide a technological solution to a problem that arises squarely in the realm of technology and are not well-understood, routine, or conventional to a skilled artisan in the field of the present invention.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 is a schematic diagram showing a hypothetical PMST search or query screen with secondary data source filters in accordance with certain embodiments.

Figure 1:
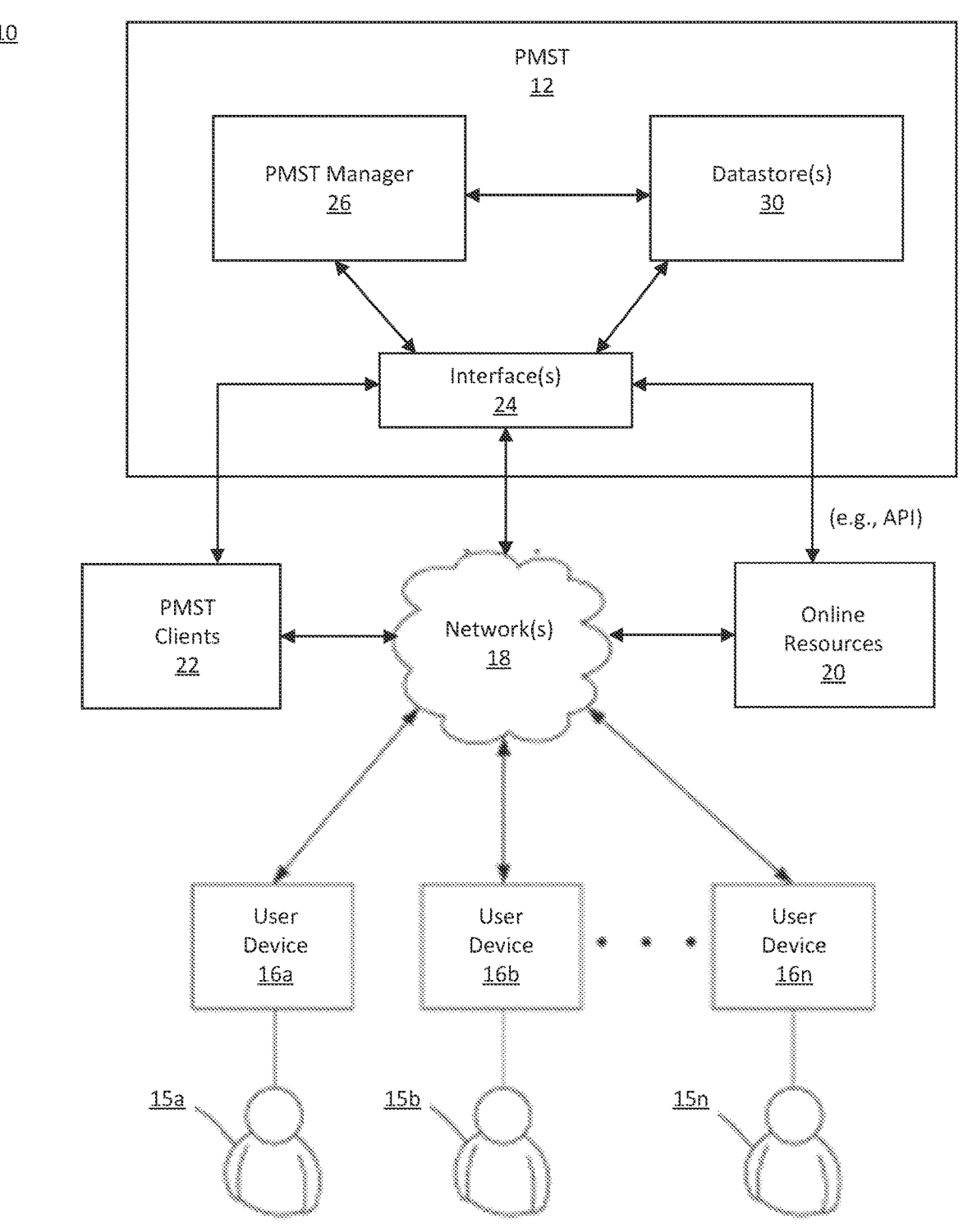
FIG. 1 is a schematic block diagram illustrating one embodiment of an exemplary Predictive Multidimensional Selection system consistent with the present disclosure.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires.

A "set" includes one or more members, even if the set description is presented in the plural (e.g., a set of Xs can include one or more X).

The term "predictive" generally means taking into account expected changes of a consideration element or combination of consideration elements over time.

Certain embodiments provide a Predictive Multidimensional Search and Selection Tool (referred to herein for convenience as "PMST") that allows users to leverage publicly available historic and predictive data in decision-making processes such as searches and queries (referred to herein collectively as a "search" regardless of the form of the search), particularly (but not limited to) decision-making processes relating to location- and time-based decisions such as, for example, where and when to locate, relocate, or take other action for habitation, business, or other concerns. Embodiments combine predictive modeling with the ability to set rules and define human-in-the-loop (HITL) edge cases for long-term decision-making based on user-specified priorities and data sources (including external data sources such as publicly available historic and predictive data) to use as filters in predicting locations and timeframes such as for determining habitation or storage options that meet the individual user's need.

The inventors' impetus for the PMST was their recognition that areas suitable for human habitation and other uses (e.g., asset storage) are changing drastically due to climate change and other factors. Although there are volumes of publicly available predictive data on such things as fire hazards, flood risk zones, and other predictive data indicating, e.g., where not to relocate, it would be very difficult for an average person to use such publicly-available data to determine, e.g., where to relocate and when. For but one example, imagine a user who is considering leaving their family home in California due to skyrocketing fire insurance prices trying to decide where and when to move based on a combination of predictive fire risk data, school ratings, gas price heat maps, crime rates, property prices, climate/ weather predictions, and other criteria according to the user's relative weighting or prioritization of such criteria (referred to herein as a user's Ethos). Using the PMST, the user can search for locations that are determined or filtered according to the user's Ethos without the user having to know how to interpret (or even how to access) the publicly-available information, and also without having to know how to collate, normalize, and weight various (sometimes competing) data sources. For example, the PMST might produce a number of relocation options, e.g., move to Oregon in 1 year or move to Colorado in 4 years in order to meet the user's search criteria. It should be noted that the PMST can be used for practically any type of search using practically any publicly-available data (referred to herein as secondary source data) alone and/or in combination with user-specific data (referred to herein as primary source data). Thus, for example, users could search for such things as where/when to relocate/reconfigure/construct/abandon asset storage facilities (e.g., based on solar index, fire risk, flood risk, predicted labor market availability, electricity prices, and tax criteria x years from now), where/when to construct a building, where/when to open or close a business, where/ when to position solar panels or wind turbines, where/when to have a wedding, etc.

In certain embodiments, PMST allows users to select which of multiple data sources to be used in the decision-making process, e.g., as filters that can act as selection criteria to be used for automated decision-making and to create predictive results that can be shown visually, and also allows users to specify how those different data sources are applied in the decision-making process, e.g., through rules governing decision automation based on selection criteria. The rules generally include criteria for filtering and combining data sources, e.g., through relative weighting of the selected data sources such as to prioritize one type of data or interest over another, and also may include criteria for triggering human-in-the-loop (HITL) input such as to address edge cases or ambiguities (e.g., HITL may be triggered when confidence in a particular outcome is below a predetermined threshold or when the likelihood of a significant event is above a predetermined threshold). In certain embodiments, PMST can employ machine learning to learn such things as how decisions are made, what data and criteria is used to make decisions, and the quality and trustworthiness of data sources (which in turn can be used to add labels or confidence levels to data sources) based on historic user choices including HITL input. PMST can be implemented as a stand-alone service (e.g., a cloud-based service to which searches or queries are directed) or can be integrated into a search engine or other application.

FIG. 1 illustrates one embodiment of an exemplary system 10 consistent with the present disclosure. As shown, the system 10 includes a Predictive Multidimensional Search and Selection Tool (PMST) 12 comprising one or more servers that, for example, may run on an enterprise computing system and/or an external computing system (e.g., a cloud-based computing system). It should be noted that the term "server" is used herein broadly to mean any computing device or system that can perform the types of operations discussed herein and is not limited, for example, to a physical or virtual server computer.

The system 10 also may include one or more user computing devices 16(a)-16(n), which, for convenience, may be referred to herein individually as a user device 16 or collectively as user devices 16. The user devices 16 may communicate with the PMST 12 over one or more networks 18. The network(s) 18 may be or include any network that carries data. Non-limiting examples of suitable networks that may be used in whole or in part as network 18 include a private or non-private local area network (LAN), personal area network (PAN), storage area network (SAN), backbone network, global area network (GAN), wide area network (WAN), metropolitan area network (MAN), virtual private networks (VPN), or collection of any such communication networks such as an intranet, extranet or the Internet (i.e., a global system of interconnected networks upon which various applications or service run including, for example, the World Wide Web). The user devices 16 may communicate with the server system 12 over a wireless communication system that can include any suitable wireless communication technology. Non-limiting examples of suitable wireless communication technologies include various cellular-based data communication technologies (e.g., 2G, 3G, 4G, LTE, 5G, GSM, etc.), Wi-Fi wireless data communication, wireless LAN communication technology (e.g., 802.11), Bluetooth wireless data communication, Near Field Communication (NFC) wireless communication, other networks or protocols capable of carrying data, and combinations thereof. In some embodiments, network 18 is chosen from the internet, at least one wireless network, at least one cellular communication network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The user devices 16 may be embodied as any type of device for communicating with the PMST 12. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. One or more user devices 16 may be, or may be operated as, an administrator console, e.g., for configuring and controlling operation of the PMST 12.

User devices 16(a)-16(n) may be associated with corresponding users 15(a)-15(n), who, for convenience, may be referred to herein individually as a user 15 or collectively as users 15, although it should be noted that certain user devices 16 may be unrelated to a specific user 15 (e.g., a user device 16 operating autonomously or associated with a non-user entity such as a company, vehicle, etc.). In the present context, the users 15 may include administrators, customers, developers, or clients of a service provided by the PMST 12. The users 15 may also include particular persons to which the service is directed. A particular user device 16 may be used by different users 15 at different times, e.g., through a login process.

Among other things, the PMST 12 includes one or more interfaces 24 (e.g., one or more interfaces to the network 18, one or more application program interfaces, etc.), one or more datastores 30, and a PMST Manager 26. The PMST Manager 26 is configured to communicate and share data with one or more user devices 16 over a network 18 via the interface(s) 24 and, conversely, the user devices 16 are configured to communicate and share data with the PMST Manager 26 over the network 18 via the interface(s) 24, which can include data entered by users 15, data from any of various applications running on the user devices 16, and data generated by the user devices 16 themselves (e.g., location/GPS data). The interface(s) 24 also provide access to various online resources 20 and also provide an interface (e.g., user or software) for configuring, controlling, and otherwise interacting with the PMST Manager 26 (e.g., for providing HITL feedback to the PMST Manager 26). Services provided by the PMST Manager 26 as described in greater detail below may be used by one or more internal or external PMST Clients 22 such as, for example, search engines, web clients, enterprise applications, mobile applications, ecommerce applications, and other applications that may provide data to the PMST Manager 26 for processing and/or may receive results data from the PMST Manager 26.

Figure 2:
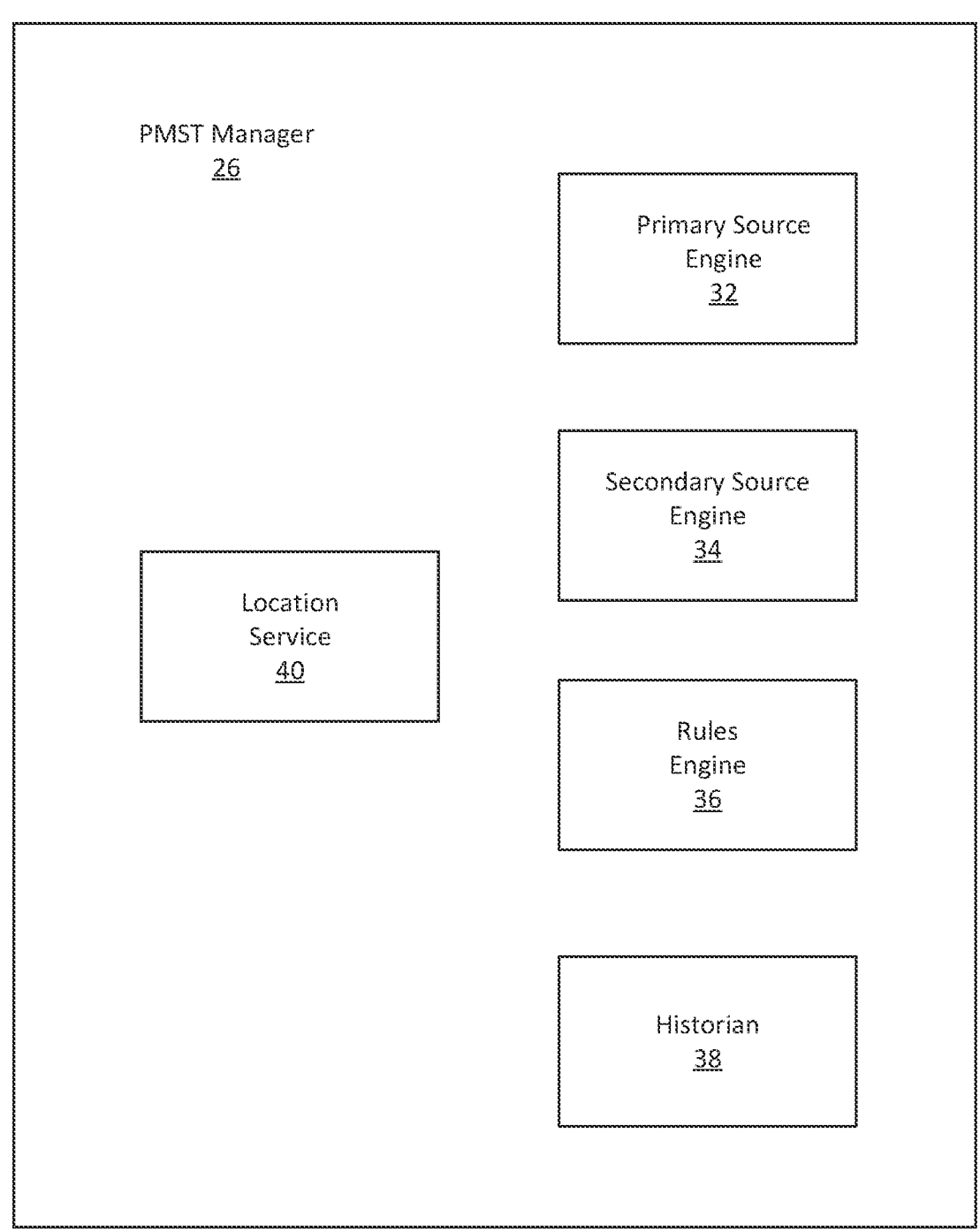
FIG. 2 is a schematic diagram showing elements of the Predictive Multidimensional Selection Manager in accordance with certain embodiments.
Figure 3:
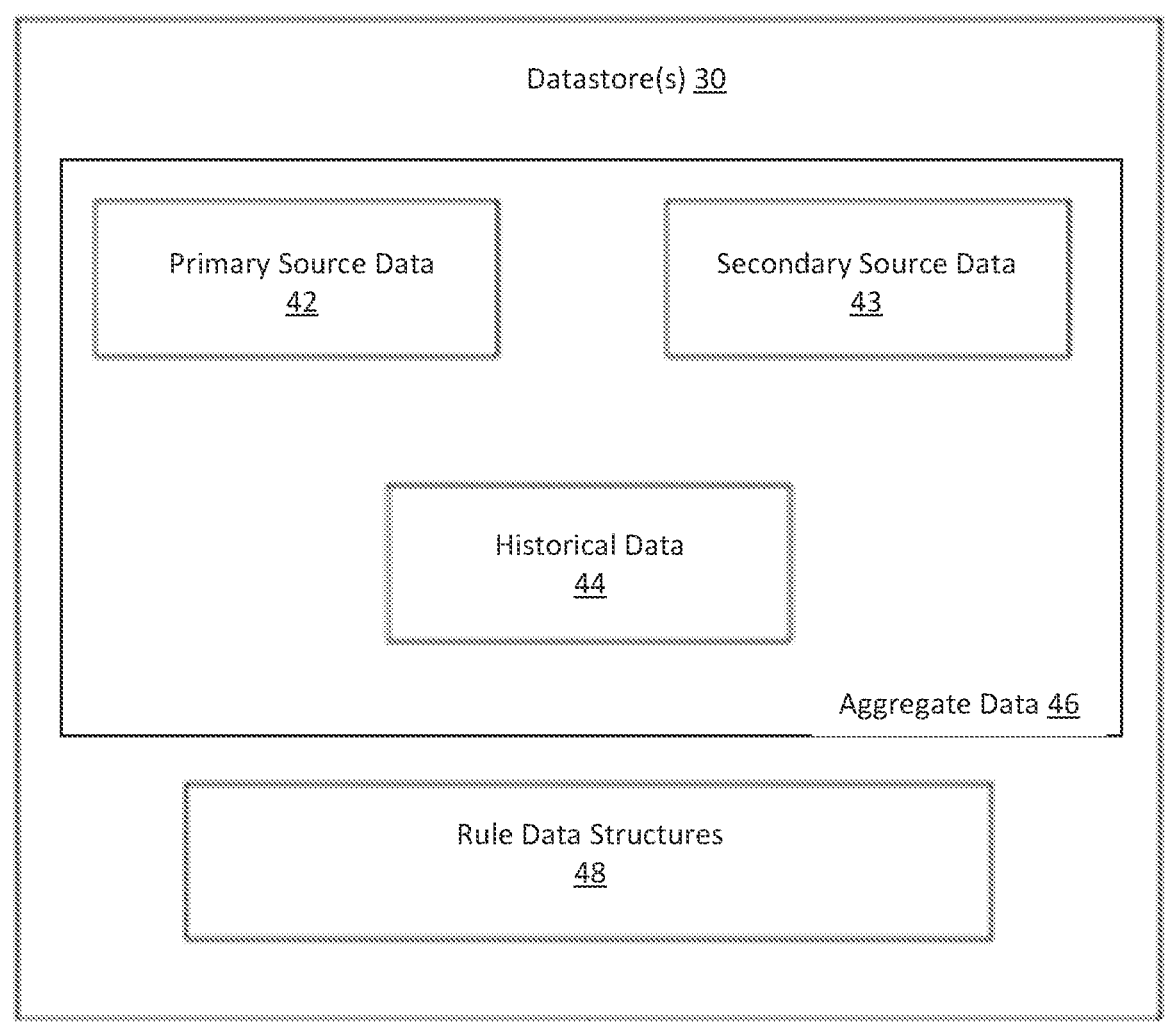
FIG. 3 is a schematic diagram showing different types of data stored in the Datastore(s) in accordance with certain embodiments.

FIG. 2 is a schematic diagram showing elements of the PMST Manager 26 in accordance with certain embodiments. Among other things, the PMST Manager 26 includes a Primary Source Engine 32, a Secondary Source Engine 34, a Rules Engine 36, a Historian 38, and a Location Service 40. These components are described below with reference to the various types of data stored in the datastore(s) 30 as depicted schematically in FIG. 3.

The Primary Source Engine 32 can generate and store data (referred to herein for convenience as "primary source data 42") in the one or more datastores 30. The primary source data 42 can include such things as company-specific data (e.g., assets and location data, time periods for use in location service processing, etc.) and analytics (e.g., data from Machine Learning/Artificial Intelligence processing of company-specific data).

The Secondary Source Engine 34 can obtain, store, and process data (referred to herein for convenience as "secondary source data 43") from online sources 20 such as, for example, databases, libraries, websites, free and subscription services, cloud services, etc. These online resources may be accessible over the network 18 and/or via another access system such as an application program interface (API) via the interface(s) 24. The secondary source data 43 can be supplemented or enhanced such as with analytics (e.g., data from Machine Learning/Artificial Intelligence processing of secondary source data).

The Location Service 40 collates data based on location and time for use in decision-making processes. In certain embodiments as discussed herein, location and time information is used in the decision-making process such as in choosing an appropriate location for a given future time, e.g., to choose environmentally compatible locations for long-term asset storage, future habitation, or other uses (e.g., where to locate a franchise, when to close a store, where/when to have a wedding, etc.). Such decisions can be based on any of a wide range of publicly-available predictive data, e.g., climate-related data (e.g., weather maps, FEMA flood risk zones, solar power availability maps, global sea rise predictions, EPA air quality maps, USGS wildland fire potential maps, USGS seismic hazard maps, EPA drinking water availability maps, etc.), human evolution and migration data, population data, technology trend data, housing data (e.g., property prices, crime rates, school ratings, etc.), resource availability data (e.g., gas price heat maps, energy availability, construction material availability, dark fiber availability maps, etc.), education and job data, geopolitical data (e.g., war zones and war zone predictions), socioeconomic data, legal/regulatory data, etc.

It should be noted that the primary source data and secondary source data can be collated and correlated in various ways such as to enhance the quality and/or volume of the data (e.g., embellish the data such as by filtering out unreliable or inconsistent data, interpolating or adding inferences to the data, scoring the data, normalizing the data, etc.).

The Historian 38 stores historical data 44 relating to prior searches, selections, and related decision-making processes (e.g., what data was used and how was a decision made based on the data and rules). The historical data 44 can be used to learn from historic decisions to use in predicting future decisions.

Thus, generally speaking, the PMST Manager 26 has access to a wide variety of data including and derived from the primary source data 42 and the secondary source data 43 as well as historical data 44 such as previous searches, selections, and related decision-making maintained by the Historian 38. For convenience, this wide variety of data is referred to herein as aggregate data 46.

The Rules Engine 36 applies various rule data structures 48 to the aggregate data 46 as part of a search and/or selection process. In accordance with certain embodiments, the following is a minimum viable data structure for rules automation:

ContextSource:
  ContextName,
  DataMap to Context,
  DataSourceArray (ContextData1 . . . ContextDataN)
Ethos:
  CompanyName,
  ContextArray [(Context1, Context1Weight) . . . (Con-
    textN, ContextNWeight)]
Company:
  CustomerName,
  EthosForeignKey (a reference to the Company's Ethos),
  ContextSourceForeignKey (a reference to the Context-
    Source),
  datatime Version,
  UserID
Historian:
  HistoricalDecisionID,
  CustomerNameForeignKey,
  EthosForeignKey,
  SuggestionMade,
  DecisionMade The minimum viable data structure allows the Rules Engine 36 to record individual Ethos, time periods, or contexts for decision making, which can be tied to companies, and which enables weighting of various data sources.

Within this data structure, ContextSource is used to specify one or more data sources to be used in the decision-making process, and Ethos is used to set the weights for the various data sources (e.g., Context1 Weight for ContextData1, Context2Weight for ContextData2, etc.). It should be noted that the data sources, weights, and other parameters can be programmed by or for the user or can be provided in other ways such as through selectable options or data entry fields of a search or query user interface. Unlike other search or query services, embodiments allow users to apply publicly-available data sources to decision-making processes and further to specify parameters for weighting or otherwise defining how the various data sources are applied.

It should be noted that some or all of the aggregate data 46 can be published (e.g., over the Internet or through social media or other online outlets) and itself become secondary source data 43 for others to use. For example, embodiments can provide crowdsourced and automatic long-term data source governance including such things as automatic data update reminders, expiration labels, and self-identification options. Embodiments also can include a social component with sharable views to make crowdsourced insights available to wider audiences. Embodiments also can include an option to request data from external entities. Thus, embodiments can encourage crowdsourcing of data and data analytics.

It also should be noted that rules can be automated, e.g., learned from past user behaviors and PMST decisions such as using machine learning (ML) or artificial intelligence (AI) processing. Different learning and training models can provide different decision outputs and therefore the PMST is capable of providing a variety of output recommendations for a given search or query not only based on the specified data sources but also based on different ways of interpreting and combining the data sources. Thus, for example, embodiments can include multiple decision-making processes (e.g., cloud-based engines) that use different decision-making logic for a given search or query to produce decision options that can be presented to the user.

FIG. 4 is a schematic diagram showing a hypothetical PMST search or query screen with secondary data source filters in accordance with certain embodiments. Conceptually, secondary data source labels become filter criteria for a search or query. In this example, secondary data source filters selected by the user include Solar Power Availability [e.g., Hours usable sunlight per year], Flood Risk [e.g., Immediate (within 5 years), Near Term (within 10 years), Long Term (after 10 years)], Dark Fiber Availability [e.g., Number of potential providers], U.S. EPA Drinking Water Availability [e.g., Population Capacity], and USGS National Seismic Hazard Map [e.g., Risk Tolerance]. The user can also specify a desired timeframe, e.g., year, duration, etc. As discussed above, any of a wide variety of additional or alternative secondary data sources can be selected by the user. Also, any of a variety of primary data sources also can be included as filter criteria, e.g., based on company-specific information. Thus, the PMST combines individually-accessible public resources into a single platform from which users can drill down, compare, and combine sources of information, with data combining/overlay results being sharable and also recyclable as additional sources of information for use in future searches and queries.

Among other things, using such a search or query screen would allow users to find future locations meeting user-specified search criteria. Without limitations, some examples include a family finding a new town to move to in 2025 for 4 years, a climate refugee organization predicting where to fundraise for disaster relief, a storage provider finding a list of suitable locations for new storage facilities in 2040, a solar provider finding existing energy storage and distribution pipelines to collaborate with larger utility companies, residents of a small seaside town picking a rural town with a waning population to move to, a seaside retirement community finding an alternative lakeside location to move to during hurricane season starting in 2027, a cellular provider identifying towers to migrate away from "heat islands" in 2032, locating a data center to minimize utility costs during operations from 2025-2045, estimating the duration of profitability for existing ski resort locations over the next 20 years due to expected snowfall or snow melt and population migration, a cellular provider identifying when to migrate due to predictive heat island effects, etc.

It should be noted that the present invention is in no way limited to or by any particular user interface or manner of selecting or specifying filter criteria. Thus, for example, a user interface may employ natural language processing to allow the user to narrate a search or query as well as the filter criteria including secondary data sources and weights.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the server system 12 including the Predictive Multidimensional Search and Selection Manager 26) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A predictive multidimensional search and selection system comprising:

at least one datastore;

at least one communication interface; and at least one processor coupled to at least one memory containing instructions which, when executed by the at least one processor, implement a predictive multidimensional search and selection tool (PMST) manager comprising:

a primary source engine that generates and stores primary source data in the at least one datastore;

a secondary source engine that obtains secondary source data via the at least one communication interface and stores the secondary source data in the at least one datastore, the secondary source data including publicly available predictive data from a plurality of secondary data sources, the publicly available predictive data providing expected future changes of at least one consideration element over time;

a location service that collates the primary source data and the secondary source data including the expected future changes of the at least one consideration element over time by location and time to produce aggregate data;

a user interface through which a user enters a user search and a user-specific ethos that specifies user-selected secondary data sources of the plurality of secondary data sources and relative weights of the user-selected secondary data sources to apply to the user search through selectable options, data entry fields, or natural language processing of the user interface, wherein the user-specific ethos is stored as user-specific rules in the at least one datastore; and a rules engine that applies the aggregate data to the user search in accordance with the user-specific rules stored in the at least one datastore to produce a number of output options, each output option related to a location and future time, the user-specific rules including the user-specific ethos that specifies the user-selected sec-
ondary data sources of the plurality of secondary data sources and the relative weights of the user-selected secondary data sources to apply to the user search.

2. The system of claim 1, wherein the primary source data comprises at least one of company-specific data and analytics derived from the company-specific data.

3. The system of claim 1, wherein the secondary source data comprises at least one of online source data and analytics derived from the online source data.

4. The system of claim 1, wherein at least one of the primary source engine, the secondary source engine, or the location service verifies the data.

5. The system of claim 1, wherein at least one of the primary source engine, the secondary source engine, or the location service embellishes the data.

6. The system of claim 1, wherein the user-specific rules include criteria for triggering human-in-the-loop intervention.

7. The system of claim 1, wherein the PMST manager further comprises a historian that stores historical data relating to prior searches, selections, and related decision-making processes.

8. A computer-implemented method for predictive multidimensional search and selection, the method comprising:

operating at least one processor coupled to at least one memory containing instructions which, when executed by the at least one processor, implement a predictive multidimensional search and selection tool (PMST) manager comprising:

a primary source engine that generates and stores primary source data in the at least one datastore;

a secondary source engine that obtains secondary source data via the at least one communication interface and stores the secondary source data in the at least one datastore, the secondary source data including publicly available predictive data from a plurality of secondary data sources, the publicly available predictive data providing expected future changes of at least one consideration element over time;

a location service that collates the primary source data and the secondary source data including the expected future changes of the at least one consideration element over time by location and time to produce aggregate data;

a user interface through which a user enters a user search and a user-specific ethos that specifies user-selected secondary data sources of the plurality of secondary data sources and relative weights of the user-selected secondary data sources to apply to the user search through selectable options, data entry fields, or natural language processing of the user interface, wherein the user-specific ethos is stored as user-specific rules in the at least one datastore; and a rules engine that applies the aggregate data to the user search in accordance with the user-specific rules stored in the at least one datastore to produce a number of output options, each output option related to a location and future time, the user-specific rules including the user-specific ethos that specifies the user-selected secondary data sources of the plurality of secondary data sources and the relative weights of the user-selected secondary data sources to apply to the user search.

9. The method of claim 8, wherein the primary source data comprises at least one of company-specific data and analytics derived from the company-specific data.

10. The method of claim 8, wherein the secondary source data comprises at least one of online source data and analytics derived from the online source data.

11. The method of claim 8, wherein at least one of the primary source engine, the secondary source engine, or the location service verifies the data.

12. The method of claim 8, wherein at least one of the primary source engine, the secondary source engine, or the location service embellishes the data.

13. The method of claim 8, wherein the user-specific rules include criteria for triggering human-in-the-loop intervention.

14. The method of claim 8, wherein the PMST manager further comprises a historian that stores historical data relating to prior searches, selections, and related decision-making processes.

15. A computer program product comprising at least one tangible, non-transitory computer-readable medium having embodied therein computer program instructions for predictive multidimensional search and selection, which, when executed by at least one processor of a computer server system, cause the computer server system to implement a predictive multidimensional search and selection tool (PMST) manager comprising:

a primary source engine that generates and stores primary source data in the at least one datastore;

a secondary source engine that obtains secondary source data via the at least one communication interface and stores the secondary source data in the at least one datastore, the secondary source data including publicly available predictive data from a plurality of secondary data sources, the publicly available predictive data providing expected future changes of at least one consideration element over time;

a location service that collates the primary source data and the secondary source data including the expected future changes of the at least one consideration element over time by location and time to produce aggregate data;

a user interface through which a user enters a user search and a user-specific ethos that specifies user-selected secondary data sources of the plurality of secondary data sources and relative weights of the user-selected secondary data sources to apply to the user search through selectable options, data entry fields, or natural language processing of the user interface, wherein the user-specific ethos is stored as user-specific rules in the at least one datastore; and a rules engine that applies the aggregate data to the user search in accordance with the user-specific rules stored in the at least one datastore to produce a number of output options, each output option related to a location and future time, the user-specific rules including the user-specific ethos that specifies the user-selected secondary data sources of the plurality of secondary data sources and the relative weights of the user-selected secondary data sources to apply to the user search.

16. The computer program product of claim 15, wherein the primary source data comprises at least one of company-specific data and analytics derived from the company-specific data.

17. The computer program product of claim 15, wherein the secondary source data comprises at least one of online source data and analytics derived from the online source data.

18. The computer program product of claim 15, wherein at least one of the primary source engine, the secondary source engine, or the location service verifies the data.

19. The computer program product of claim 15, wherein at least one of the primary source engine, the secondary source engine, or the location service embellishes the data.

20. The computer program product of claim 15, wherein the user-specific rules include criteria for triggering human-in-the-loop intervention.

21. The computer program product of claim 15, wherein the PMST manager further comprises a historian that stores historical data relating to prior searches, selections, and related decision-making processes.

\* \* \* \* \*